US012567969B2

(12) United States Patent (10) Patent No.: US 12,567,969 B2

Shi et al. (45) Date of Patent: Mar. 3, 2026

(54) ELECTRONIC DEVICE UNLOCKING METHOD AND RELATED DEVICE

(71) Applicant: Huawei Technologies Co., Ltd., Shenzhen (CN)

(72) Inventors: Chunlei Shi, Hangzhou (CN); Xiaoshuang Ma, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 250 days.

(21) Appl. No.: 18/549,737

(22) PCT Filed: Mar. 7, 2022

(86) PCT No.: PCT/CN2022/079602

§ 371 (c)(1),
(2) Date: Mar. 20, 2024

(87) PCT Pub. No.: WO2022/188756

PCT Pub. Date: Sep. 15, 2022

(65) Prior Publication Data

US 2024/0223376 A1 Jul. 4, 2024

(30) Foreign Application Priority Data

Mar. 12, 2021 (CN) .......................... 202110272554.7

(51) Int. Cl.
*H04L 9/32* (2006.01)
(52) U.S. Cl.
CPC .......... *H04L 9/3231* (2013.01); *H04L 9/3271* (2013.01)

(58) Field of Classification Search
CPC ..... H04L 9/3231; H04L 9/3271; G06F 21/32; G06F 21/31; G06F 21/45; G06F 21/602; G06F 21/64
See application file for complete search history.

(56) References Cited

U.S. PATENT DOCUMENTS

| | | | | |
|---|---|---|---|---|
| 5,784,566 | A | * | 7/1998 | Viavant ................... H04L 63/08 |
| | | | | 709/229 |
| 2002/0129247 | A1 | | 9/2002 | Jablon |
| 2016/0241403 | A1 | | 8/2016 | Lindemann |
| 2020/0272717 | A1 | * | 8/2020 | Figueredo de Santana ................ |
| | | | | G06V 40/172 |
| 2021/0243184 | A1 | * | 8/2021 | La Torre ............... H04L 63/083 |

FOREIGN PATENT DOCUMENTS

| | | | | |
|---|---|---|---|---|
| CN | 101129018 A | | 2/2008 | |
| CN | 107153534 A | * | 9/2017 | ............... G06F 9/52 |
| EP | 2073484 A1 | | 6/2009 | |

* cited by examiner

*Primary Examiner* — Sangseok Park
(74) *Attorney, Agent, or Firm* — Conley Rose, P.C.

(57) ABSTRACT

An electronic device unlocking method is applied to a first electronic device and includes receiving operation information sent by a second electronic device; sending first information to the second electronic device when determining, based on the operation information, to unlock a to-be-unlocked object of the first electronic device, where the first information is used by the second electronic device to collect authentication information required for unlocking the to-be-unlocked object; obtaining authentication information from the second electronic device to perform authentication of a user; and unlocking the to-be-unlocked object of the first electronic device when the authentication of the user succeeds.

20 Claims, 7 Drawing Sheets

ELECTRONIC DEVICE UNLOCKING METHOD AND RELATED DEVICE

CROSS-REFERENCE TO RELATED APPLICATIONS

This application is a U.S. National Stage of International Patent Application No. PCT/CN2022/079602 filed on Mar. 7, 2022, which claims priority to Chinese Patent Application No. 202110272554.7 filed on Mar. 12, 2021, both of which are hereby incorporated by reference in their entireties.

TECHNICAL FIELD

This application relates to the field of terminal technologies, and in particular, to an electronic device unlocking method and a related device.

BACKGROUND

In a distributed scenario, there are more scenarios for collaborative application between devices, and hardware mutual assistance and file sharing between devices become more frequent. For a security reason, when a device A (such as a computer) performs multi-screen collaboration with a device B (such as a mobile phone), and the device B enters a lock screen status, a user needs to perform an unlocking operation on the device B. Currently, this unlocking manner is inefficient and inconvenient for user operation.

SUMMARY

Embodiments of this application disclose an electronic device unlocking method and a related device, so that a first electronic device can be unlocked on a second electronic device, thereby ensuring unlocking security and convenience.

According to a first aspect, this application discloses an electronic device unlocking method applied to a first electronic device, and the method includes:

receiving operation information sent by a second electronic device;

sending first information to the second electronic device when determining, based on the operation information, to unlock a to-be-unlocked object of the first electronic device, where the first information is used by the second electronic device to collect authentication information required for unlocking the to-be-unlocked object;

obtaining the authentication information from the second electronic device to perform authentication of a user; and unlocking the to-be-unlocked object of the first electronic device when the authentication of the user succeeds.

The user inputs the authentication information on the second electronic device, and the first electronic device unlocks the first electronic device based on the authentication information inputted on the second electronic device, thereby ensuring unlocking security and convenience.

In some optional implementations, the first information is used to determine a target authentication information collector of the second electronic device, and the target authentication information collector is configured to collect the authentication information.

In some optional implementations, the first information includes:

a target authentication type corresponding to an authentication manner for unlocking the to-be-unlocked object, where the target authentication type is used by the second electronic device to determine the target authentication information collector; and/or an identifier of the target authentication information collector.

In some optional implementations, the electronic device unlocking method is applied to a scenario in which the first electronic device performs projection on the second electronic device.

In some optional implementations, the to-be-unlocked object is a screen of the first electronic device or a target application of the first electronic device, and the target application is a padlocked application.

In some optional implementations, the determining, based on the operation information, to unlock a to-be-unlocked object of the first electronic device includes:

determining that the operation information indicates to unlock the screen of the first electronic device; or determining that the operation information indicates to open the target application.

In some optional implementations, the obtaining the authentication information from the second electronic device to perform authentication of a user includes:

obtaining the authentication information from the second electronic device based on a password authentication protocol to perform authentication of the user.

In some optional implementations, the obtaining the authentication information from the second electronic device based on a password authentication protocol to perform authentication of the user includes:

receiving a remote attestation credential that is of the user and that is sent by the second electronic device, where the remote attestation credential includes a salt value and a first base value;

generating a first public key and a first private key based on the first base value;

generating a random number as a first challenge value;

sending the salt value, the first public key, and the first challenge value to the second electronic device;

receiving a second public key, a second challenge value, and first signature data that are sent by the second electronic device, where the second public key is generated by the second electronic device based on a second base value, the second base value is generated by the second electronic device based on the salt value and the authentication information, the second challenge value is a random number generated by the second electronic device, the first signature data is generated by the second electronic device by performing signing on the first challenge value and the second challenge value using a first key, the first key is obtained by the second electronic device by performing an operation on a second private key and the first public key, and the second private key is generated by the second electronic device based on the second base value;

performing an operation on the first private key and the second public key to obtain a second key;

performing signing on the first challenge value and the second challenge value using the second key, to generate second signature data; and determining an authentication result based on the first signature data and the second signature data.

In some optional implementations, before the obtaining the authentication information from the second electronic device to perform authentication of a user, the method further includes: receiving an authentication request sent by the second electronic device.

In some optional implementations, before the sending first information to the second electronic device, the method further includes:

determining the authentication manner for unlocking the to-be-unlocked object.

In some optional implementations, the determining the authentication manner for unlocking the to-be-unlocked object includes:

determining an authentication manner used by the first electronic device;

determining an authentication manner supported by the second electronic device; and determining a first authentication manner that is used by the first electronic device and supported by the second electronic device as the authentication manner for unlocking the to-be-unlocked object.

In some optional implementations, the operation information includes a device identifier of the second electronic device, and the determining an authentication manner supported by the second electronic device includes:

determining, based on the device identifier of the second electronic device, the authentication manner supported by the second electronic device.

In some optional implementations, the determining, based on the device identifier of the second electronic device, the authentication manner supported by the second electronic device includes:

obtaining collector information of the second electronic device based on the device identifier of the second electronic device, where the collector information of the second electronic device indicates an authentication information collector included in the second electronic device; and determining, based on the collector information of the second electronic device, the authentication manner supported by the second electronic device.

In some optional implementations, the determining, based on the collector information of the second electronic device, the authentication manner supported by the second electronic device includes:

when determining, based on the collector information of the second electronic device, that the second electronic device includes a face image collector, and/or a fingerprint collector, and/or a password collector, determining that the authentication manner supported by the second electronic device includes password authentication, and/or fingerprint authentication, and/or face authentication.

In some optional implementations, if a plurality of authentication manners are used by the first electronic device and supported by the second electronic device, the first authentication manner is an authentication manner with a highest priority in the plurality of authentication manners.

In some optional implementations, the authentication manner for unlocking the to-be-unlocked object is password authentication, and the target authentication type is a four-digit numerical password, a six-digit numerical password, a user-defined numerical password, a pattern lock, or a hybrid password;

the authentication manner for unlocking the to-be-unlocked object is face authentication, and the target authentication type is 2D face authentication or 3D face authentication; or the authentication manner for unlocking the to-be-unlocked object is fingerprint authentication, and the target authentication type is an in-screen fingerprint, a side fingerprint, or an under-screen fingerprint.

According to a second aspect, this application discloses an electronic device unlocking method applied to a second electronic device, and the method includes:

sending operation information of a user operation performed by using the second electronic device to a first electronic device, where the user operation triggers unlocking of a to-be-unlocked object of the first electronic device;

receiving first information from the first electronic device, where the first information is sent when the first electronic device determines, based on the operation information, to unlock the to-be-unlocked object of the first electronic device, and is used by the second electronic device to collect authentication information required for unlocking the to-be-unlocked object;

collecting, based on the first information, the authentication information required for unlocking the to-be-unlocked object; and providing the authentication information to the first electronic device to perform authentication of a user, where a result of the authentication of the user is used to determine whether to unlock the to-be-unlocked object.

In some optional implementations, the user operation is for unlocking a screen of the first electronic device; or the user operation is for opening a target application of the first electronic device, where the target application is a padlocked application.

According to a third aspect, this application discloses a computer-readable storage medium, including computer instructions. When the computer instructions are run on an electronic device, the electronic device is enabled to perform the electronic device unlocking method according to the first aspect or the second aspect.

According to a fourth aspect, this application discloses an electronic device. The electronic device includes a processor and a memory. The memory is configured to store instructions, and the processor is configured to invoke the instructions in the memory, to enable the electronic device to perform the electronic device unlocking method according to the first aspect or the second aspect.

According to a fifth aspect, this application discloses a chip system. The chip system is applied to an electronic device. The chip system includes an interface circuit and a processor. The interface circuit and the processor are interconnected through a line. The interface circuit is configured to receive a signal from a memory of the electronic device, and send the signal to the processor, where the signal includes computer instructions stored in the memory. When the processor executes the computer instructions, the chip system performs the electronic device unlocking method according to the first aspect or the second aspect.

According to a sixth aspect, this application discloses a computer program product. When the computer program product is run on a computer, the computer is enabled to perform the electronic device unlocking method according to the first aspect or the second aspect.

According to a seventh aspect, this application discloses an apparatus. The apparatus has functions of implementing behaviors of the electronic device in the method provided in the first aspect or the second aspect. The functions may be implemented by hardware, or may be implemented by executing corresponding software by hardware. The hardware or software includes one or more modules corresponding to the foregoing functions.

It should be understood that, the computer-readable storage medium according to the third aspect, the electronic device according to the fourth aspect, the chip system according to the fifth aspect, the computer program product according to the sixth aspect, and the apparatus according to the seventh aspect are all corresponding to the methods of the first aspect and the second aspect. Therefore, for beneficial effects that can be achieved therein, refer to the beneficial effects of the corresponding methods provided above. Details are not described herein again.

DESCRIPTION OF EMBODIMENTS

To ease of understanding, examples of some concepts related to embodiments of this application are described for reference.

It should be noted that, in this application, "at least one" means one or more, and "a plurality of" means two or more. The term "and/or" describes an association relationship for describing associated objects and represents that three relationships may exist. For example, A and/or B may represent the following three cases: Only A exists, both A and B exist, and only B exists, where A and B may be singular or plural. In the specification, claims, and accompanying drawings of this application, the terms "first", "second", "third", "fourth", and the like (if existing) are intended to distinguish between similar objects but do not necessarily indicate a specific order or sequence.

To better understand an electronic device unlocking method and a related device disclosed in embodiments of this application, the following first describes an application scenario of the electronic device unlocking method in this application.

Figure 1:
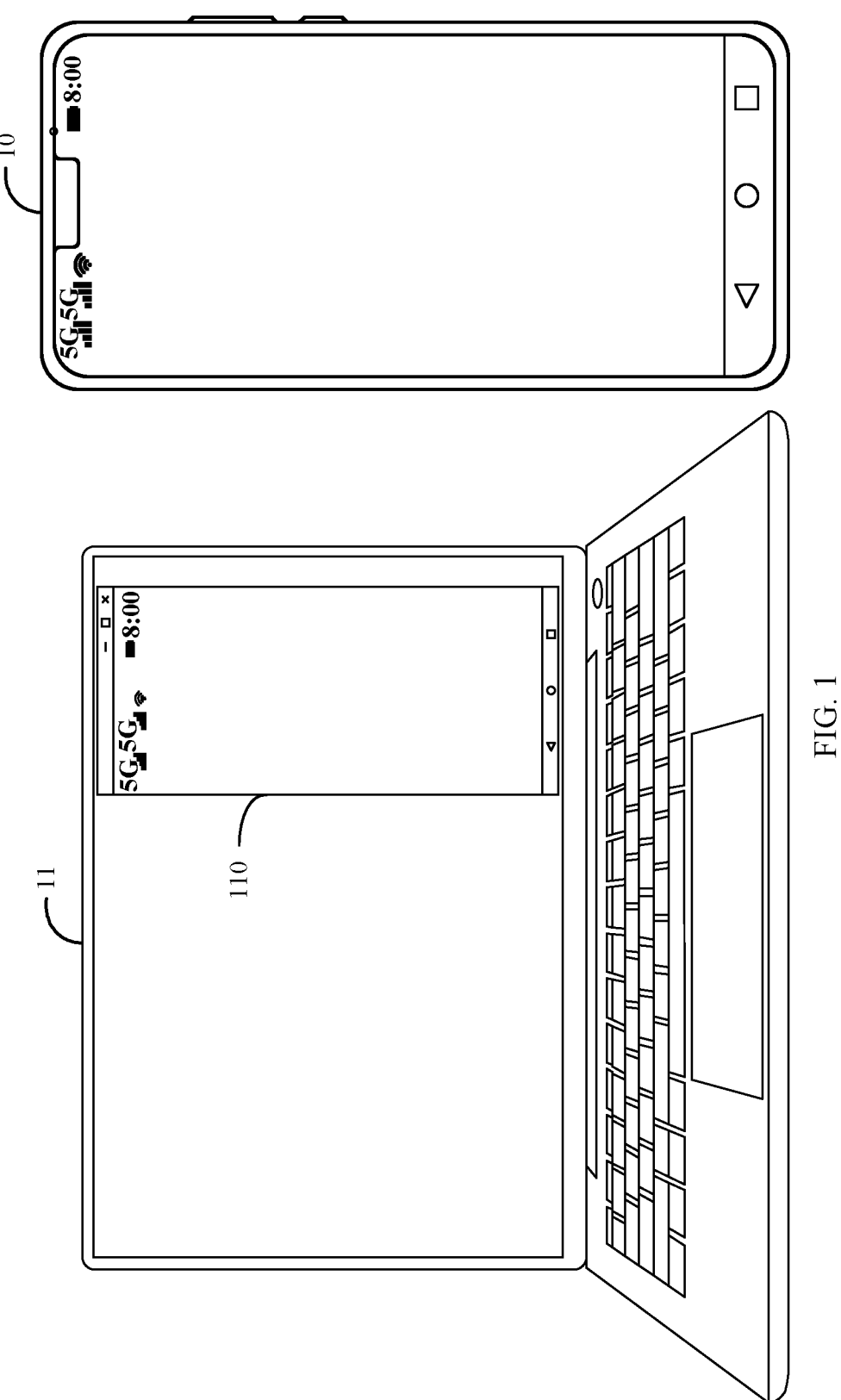
FIG. 1 is a schematic diagram of an application scenario of an electronic device unlocking method according to an embodiment of this application.

FIG. 1 is a schematic diagram of an application scenario of an electronic device unlocking method according to an embodiment of this application.

As shown in FIG. 1, a first electronic device 10 performs projection on a second electronic device 11, and a collaboration window 110 of the first electronic device 10 is displayed on the second electronic device 11. The first electronic device 10 (a mobile phone in the figure) may perform multi-screen collaboration with the second electronic device 11 (a computer in the figure), and a user performs an operation on the first electronic device 10 through the collaboration window 110. For example, the first electronic device 10 is a mobile phone, and the second electronic device 11 is a computer. The user may operate the mobile phone through the collaboration window 110, for example, open a file in the mobile phone, answer an audio or video call on the mobile phone, and play music on the mobile phone.

For a security reason, when a screen of the first electronic device 10 is locked or an application of the first electronic device 10 is locked/padlocked, an existing multi-screen collaboration technology does not support unlocking the screen or the application of the first electronic screen 10 on the second electronic device 11. The user needs to unlock the screen or the application of the first electronic screen 10 on the first electronic device 10.

According to the electronic device unlocking method disclosed in embodiments of this application, when the first electronic device 10 performs multi-screen collaboration with the second electronic device 11, if the first electronic device 10 enters a lock status (screen locking or application padlocking), the user does not need to perform an unlocking operation on the first electronic device 10, and can directly unlock the screen or the application of the first electronic device 10 on the second electronic device 11 through the collaboration window 110, thereby ensuring unlocking security and convenience.

Figure 2:
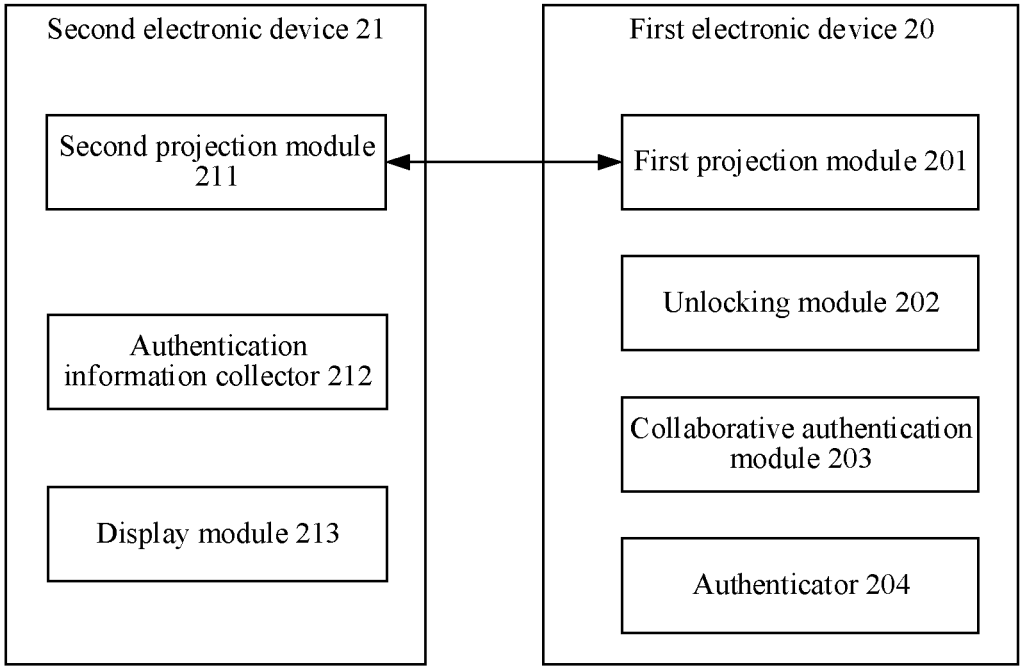
FIG. 2 is a function architectural diagram of a first electronic device and a second electronic device to which an electronic device unlocking method according to an embodiment of this application is applied.

FIG. 2 is a function architectural diagram of a first electronic device and a second electronic device to which an electronic device unlocking method according to an embodiment of this application is applied.

The electronic device unlocking method in this application is applied to a first electronic device 20 (for example, the mobile phone in FIG. 1) and a second electronic device 21 (for example, the computer in FIG. 1). The first electronic device 20 includes a first projection module 201, an unlocking module 202, a collaborative authentication module 203, and an authenticator 204. The second electronic device 21 includes a second projection module 211, an authentication information collector 212, and a display module 213.

The first projection module 201 is configured to provide a multi-screen collaboration capability for the first electronic device 20, to implement an interaction between the first electronic device 20 and the second electronic device 21.

The unlocking module 202 is configured to unlock a screen or an application of the first electronic device 20. In an embodiment of this application, the unlocking module 202 may include a screen unlocking submodule and an application unlocking submodule (not shown in the figure). The screen unlocking submodule is configured to unlock the screen of the first electronic device 20, and the application unlocking submodule is configured to unlock the application of the first electronic device 20.

The collaborative authentication module 203 is configured to schedule the authenticator 204 of the first electronic device 20 and the authentication information collector 212 of the second electronic device 21.

The first electronic device 20 may use a plurality of authentication manners, and each authentication manner may correspond to one authenticator 204. For example, an authenticator corresponding to password authentication is a password authenticator, an authenticator corresponding to fingerprint authentication is a fingerprint authenticator, and an authenticator corresponding to face authentication is a face authenticator.

The authenticator 204 is configured to perform authentication on the first electronic device 20 based on authentication information received from the second electronic device 21.

The second projection module 211 is configured to provide a multi-screen collaboration capability for the second electronic device 21, to implement the interaction between the second electronic device 21 and the first electronic device 20.

The authentication information collector 212 is configured to collect authentication information of a user. The authentication information collected by the authentication information collector 212 may include a password, a fingerprint, a face image, and the like.

The display module 213 is configured to display a user interface in a process of unlocking the first electronic device 20.

Figure 3A:
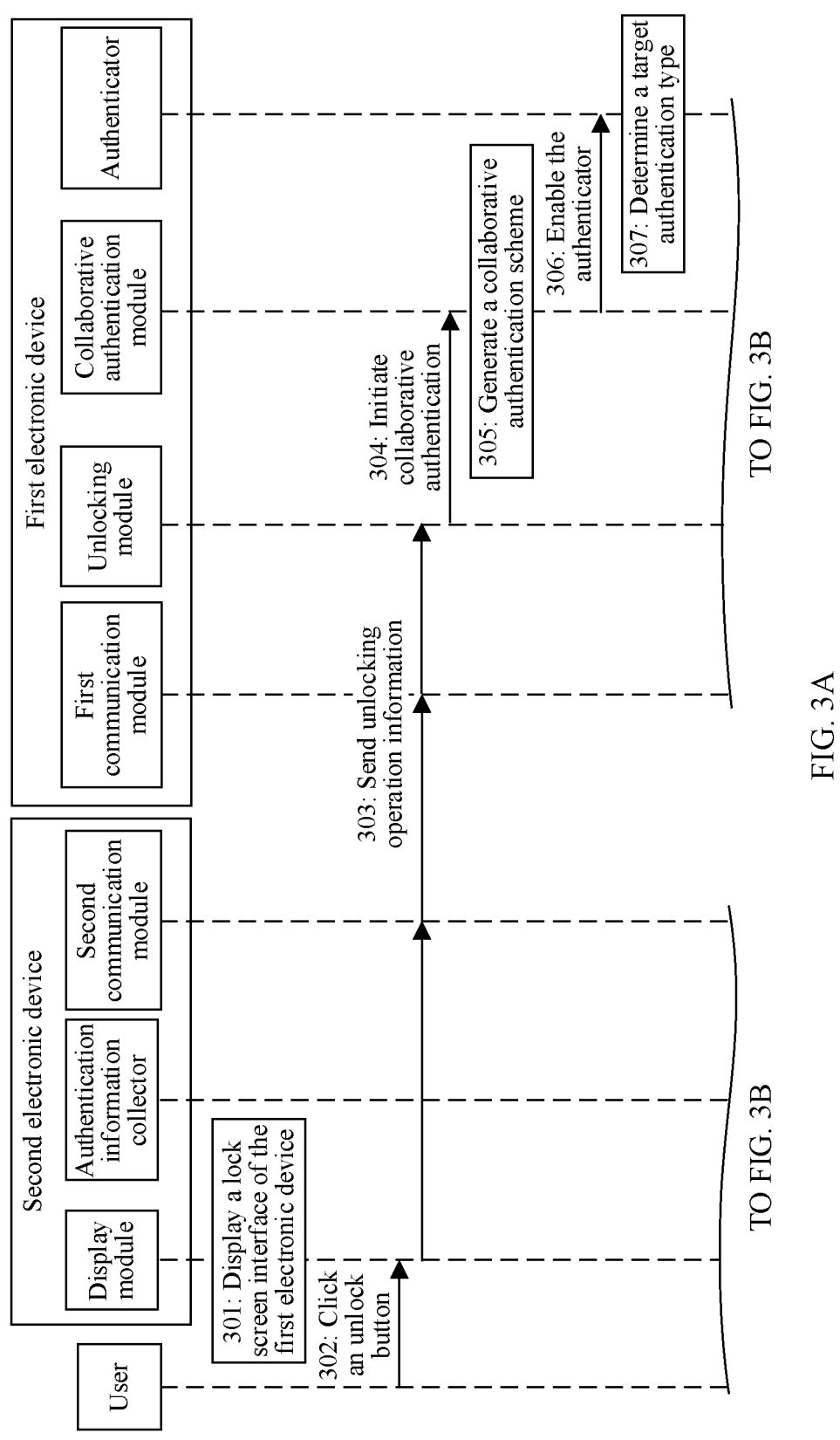
FIG. 3A and FIG. 3B are flowcharts of an electronic device unlocking method according to an embodiment of this application.
Figure 3B:
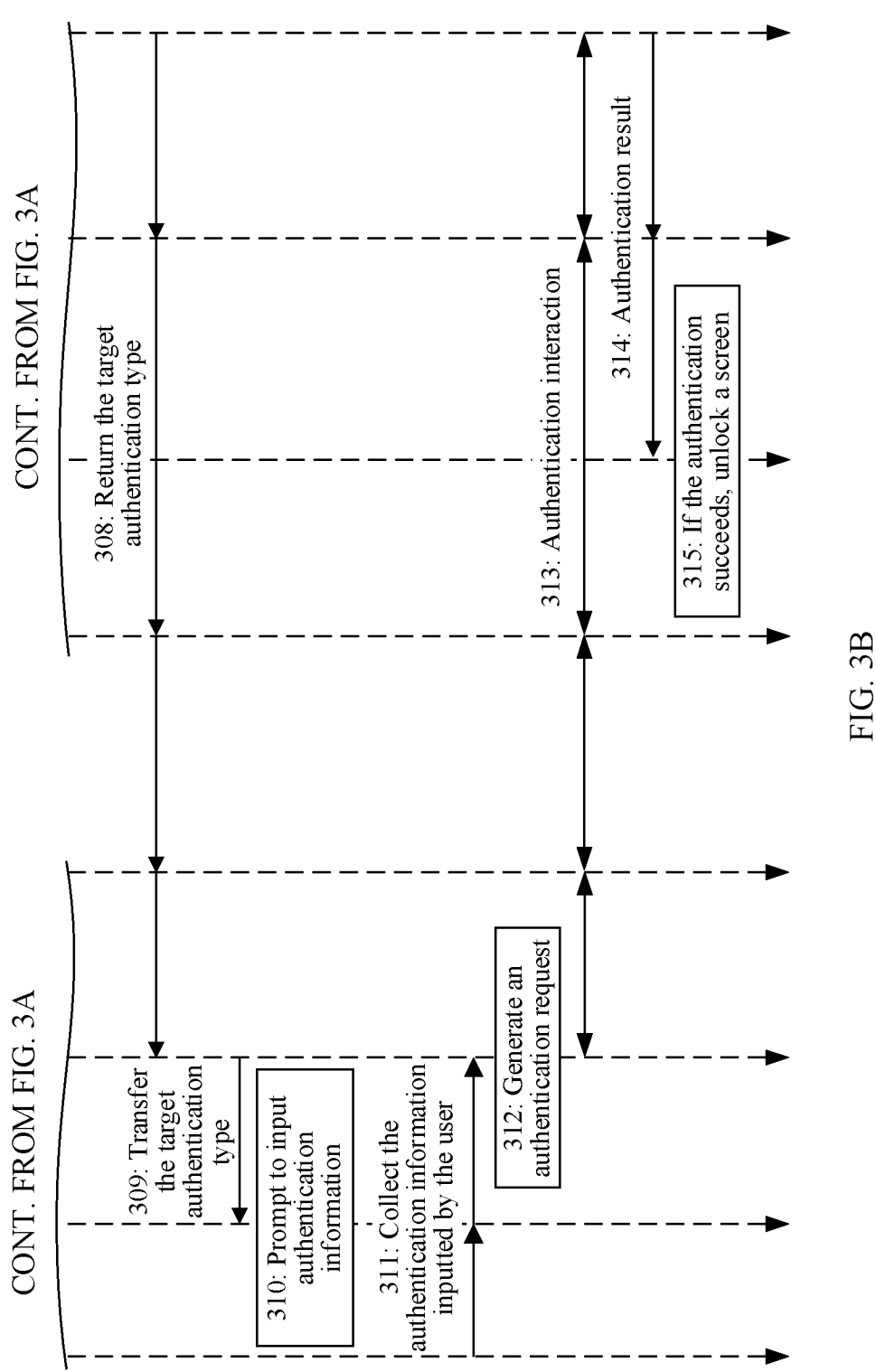

The following describes a specific function of each module with reference to flowcharts shown in FIG. 3A and FIG. 3B.

FIG. 3A and FIG. 3B are flowcharts of an electronic device unlocking method according to an embodiment of this application.

In FIG. 3A and FIG. 3B, an example in which a screen of a first electronic device (for example, a mobile phone) is unlocked on a second electronic device (for example, a computer) is used for description.

The first electronic device includes a first projection module, an unlocking module, a collaborative authentication module, and an authenticator. The second electronic device includes a second projection module, an authentication information collector, and a display module (referring to FIG. 2). The first electronic device performs projection on the second electronic device, and the second electronic device displays a collaboration window of the first electronic device on a screen of the second electronic device.

301: After the first electronic device enters a lock screen status, the display module displays a lock screen interface of the first electronic device in the collaboration window of the first electronic device.

The first electronic device enters the lock screen status after a user does not perform any operation for a period of time or the user presses a power-off key. For example, a sleep time set for the first electronic device is one minute, that is, the first electronic device enters the lock screen status if the user does not perform any operation on the first electronic device within one minute.

The lock screen interface of the first electronic device displayed in the collaboration window of the first electronic device includes an "unlock" button.

302: The user clicks the "unlock" button on the lock screen interface of the first electronic device displayed on the second electronic device.

303: The display module sends unlocking operation information to the first electronic device through the second projection module, where the unlocking operation information may include a device identifier of the second electronic device.

The unlocking operation information indicates to unlock the screen of the first electronic device.

The first electronic device interacts with the second electronic device through the first projection module and the second projection module. The second projection module first sends the unlocking operation information to the first projection module, and the first projection module then transfers the unlocking operation information to the unlocking module.

304: The unlocking module determines, based on the unlocking operation information, to unlock the screen of the first electronic device, initiates collaborative authentication to the collaborative authentication module, and sends the device identifier of the second electronic device and unlocked target information to the collaborative authentication module.

The unlocked target information indicates a to-be-unlocked object of the first electronic device. For example, the unlocking module determines, based on the unlocking operation information, that the to-be-unlocked object is the screen of the first electronic device, and the unlocked target information may be represented by "0".

305: The collaborative authentication module generates a collaborative authentication scheme based on the device identifier of the second electronic device.

The collaborative authentication scheme includes a first authentication manner, and the first authentication manner is an authentication manner for unlocking the to-be-unlocked object. In an embodiment of this application, the collaborative authentication module determines an authentication manner used by the first electronic device and an authentication manner supported by the second electronic device (the authentication manner supported by the second electronic device is determined based on the device identifier of the second electronic device), and generates the collaborative authentication scheme based on the authentication manner used by the first electronic device and the authentication manner supported by the second electronic device.

The first electronic device may store authentication resource information of the first electronic device, and the collaborative authentication module may determine, based on the authentication resource information of the first electronic device, the authentication manner used by the first electronic device. The authentication resource information of the first electronic device indicates the authentication manner used by the first electronic device. For example, the authentication manner used by the first electronic device includes password authentication, fingerprint authentication, and face authentication.

The first electronic device may preset different authentication manners for different to-be-unlocked objects. The collaborative authentication module may determine, based on the unlocked target information, an authentication manner used by the first electronic device for the to-be-unlocked object.

The collaborative authentication module may determine, based on the device identifier of the second electronic device, the authentication manner supported by the second electronic device. In an embodiment of this application, the first electronic device stores collector information of the second electronic device. The collaborative authentication module may obtain the collector information of the second electronic device based on the device identifier of the second electronic device, and determine, based on the collector information of the second electronic device, the authentication manner supported by the second electronic device. The collector information of the second electronic device indicates the authentication information collector included in the second electronic device. For example, based on the collector information of the second electronic device, the second electronic device includes a face image collector (camera), a fingerprint collector, and a password collector. Therefore, the authentication manner supported by the second electronic device includes password authentication, fingerprint authentication, and face authentication.

The collaborative authentication module determines an intersection set of the authentication manner used by the first electronic device and the authentication manner supported by the second electronic device, and determines the collaborative authentication scheme based on the intersection set of the authentication manner used by the first electronic device and the authentication manner supported by the second electronic device. For example, the authentication manner used by the first electronic device includes password authentication and face authentication, and the authentication manner supported by the second electronic device includes password authentication and fingerprint authentication. The collaborative authentication module determines that the first authentication manner is password authentication.

If the intersection set of the authentication manner used by the first electronic device and the authentication manner supported by the second electronic device includes a plurality of authentication manners, the collaborative authentication module may determine priorities of the plurality of authentication manners, and determine an authentication manner with a highest priority as the first authentication manner. For example, the intersection set of the authentication manner used by the first electronic device and the authentication manner supported by the second electronic device includes password authentication, fingerprint authentication, and face authentication, which are in descending order of priority: face authentication, fingerprint authentication, and password authentication (that is, a priority of face authentication is higher than that of fingerprint authentication, and a priority of fingerprint authentication is higher than that of password authentication), so that the first authentication manner is face authentication. Priorities of the authentication manners may be ordered based on convenience degrees of authentication.

306: The collaborative authentication module enables an authenticator corresponding to the collaborative authentication scheme, and sends the collaborative authentication scheme to the authenticator corresponding to the collaborative authentication scheme.

Each authentication manner may correspond to one authenticator, and the collaborative authentication module enables the authenticator corresponding to the collaborative authentication scheme. For example, an authenticator corresponding to password authentication is a password authenticator, an authenticator corresponding to fingerprint authentication is a fingerprint authenticator, and an authenticator corresponding to face authentication is a face authenticator. If the first authentication manner is password authentication, the collaborative authentication module enables the password authenticator.

The authenticator may return an enabling result to the collaborative authentication module. For example, if the authenticator is enabled successfully, the authenticator returns a message indicating successful enabling to the collaborative authentication module.

307: The authenticator determines a target authentication type corresponding to the collaborative authentication scheme.

The authenticator may display an authentication type setting interface, and the user may set the target authentication type corresponding to the collaborative authentication scheme in the authentication type setting interface.

For example, the first authentication manner is password authentication, and authentication types of password authentication include a four-digit numerical password, a six-digit numerical password, a user-defined numerical password, a pattern lock, and a hybrid password. The user sets, in the authentication type setting interface, the target authentication type corresponding to the collaborative authentication scheme to the six-digit numerical password.

The four-digit numerical password is a password including four digits. The six-digit numerical password is a password including six digits. The user-defined numerical password is a password including 4 to 32 digits. The pattern lock is a lock including at least four dots in a nine-square grid. The hybrid password may be a password including 4 to 32 characters, and the password includes at least one letter.

For another example, the first authentication manner is face authentication, and authentication types corresponding to face authentication include 2D face authentication and 3D face authentication. The user sets, in the authentication type setting interface, the target authentication type corresponding to the collaborative authentication scheme to 2D face authentication.

For another example, the first authentication manner is fingerprint authentication, and authentication types corresponding to fingerprint authentication include an in-screen fingerprint, a side fingerprint, and an under-screen fingerprint. The user sets, in the authentication type setting interface, the target authentication type corresponding to the collaborative authentication scheme to the in-screen fingerprint.

A default target authentication type may be set for the collaborative authentication scheme. If the user does not set the target authentication type corresponding to the collaborative authentication scheme, the default target authentication type may be used. For example, a default target authentication type of password authentication may be the six-digit numerical password, a default target authentication type of face authentication may be 2D face authentication, and a default target authentication type of fingerprint authentication may be the in-screen fingerprint.

308: The authenticator sends the target authentication type and the unlocked target information to the collaborative authentication module, and the collaborative authentication module sends the target authentication type and the unlocked target information to an authentication information collector (that is, a target authentication collector) corresponding to the collaborative authentication scheme through the first projection module and the second projection module.

For example, the target authentication type corresponding to the collaborative authentication scheme is 2D face authentication. The authenticator sends the target authentication type of 2D face authentication to the collaborative authentication module, and the collaborative authentication module sends the target authentication type of 2D face authentication and the unlocked target information (for example, screen information) to the face image collector through the first projection module and the second projection module, to enable the face image collector.

The authentication information collector may return an enabling result to the collaborative authentication module. For example, if the authentication information collector is enabled successfully, the authentication information collector returns a message indicating successful enabling to the collaborative authentication module.

In another embodiment of this application, the authenticator may determine the authentication information collector corresponding to the collaborative authentication scheme based on the target authentication type, the authenticator sends an identifier of the authentication information collector corresponding to the collaborative authentication scheme to the collaborative authentication module, and the collaborative authentication module sends the identifier of the authentication information collector corresponding to the collaborative authentication scheme to the authentication information collector corresponding to the collaborative authentication scheme through the first projection module and the second projection module.

It should be noted that, in this embodiment, each interaction between the authenticator and the authentication information collector needs to be performed through the collaborative authentication module, the first projection module, and the second projection module. When the authenticator needs to send information to the authentication information collector, the authenticator transfers the information to the collaborative authentication module, the collaborative authentication module transfers the information to the first projection module, the first projection module sends the information to the second projection module, and the second projection module transfers the information to the authentication information collector. When the authentication information collector needs to send information to the authenticator, the authentication information collector transfers the information to the second projection module, the second projection module sends the information to the first projection module, the first projection module transfers the information to the collaborative authentication module, and the collaborative authentication module transfers the information to the authenticator.

309: The authentication information collector transfers the target authentication type to the display module.

310: The display module prompts, based on the target authentication type, the user to input authentication information.

For example, if the target authentication type is the six-digit numerical password, the display module displays, based on the target authentication type, a password input box that includes six digits, and displays the password input box on a screen page of the first electronic device in the collaboration window of the second electronic device.

For another example, the target authentication type is 2D face authentication, and the display module prompts the user to photograph a face image.

For another example, the target authentication type is the in-screen fingerprint, and the display module prompts the user to press a fingerprint at an in-screen fingerprint sensor.

311: The authentication information collector collects, based on the target authentication type, the authentication information inputted by the user.

For example, the authentication information collector corresponding to the collaborative authentication scheme is the password collector, and the password collector collects a six-digit numerical password inputted by the user.

When the first authentication manner is password authentication, the user inputs a password (for example, a six-digit numerical password) in the password input box displayed by the display module, and the display module transfers the password inputted by the user to the password collector.

When the first authentication manner is face authentication, the face image collector directly collects the face image (for example, a 2D face image) of the user.

When the first authentication manner is face authentication, the fingerprint collector directly collects the fingerprint of the user.

312: The authentication information collector generates an authentication request, where the authentication request includes the authentication information inputted by the user and the unlocked target information.

313: The authentication information collector and the authenticator perform an authentication interaction through the second projection module, the first projection module, and the collaborative authentication module, and the authenticator performs authentication of the user based on the authentication information inputted by the user and the unlocked target information, to obtain an authentication result.

314: The authenticator returns the authentication result to the unlocking module through the collaborative authentication module.

315: If the authentication of the user succeeds, the unlocking module unlocks the screen of the first electronic device based on the authentication result.

If the authentication of the user succeeds, the unlocking module unlocks the screen of the first electronic device. If the authentication of the user fails, the unlocking module maintains the screen of the first electronic device in a lock status.

Figure 4:
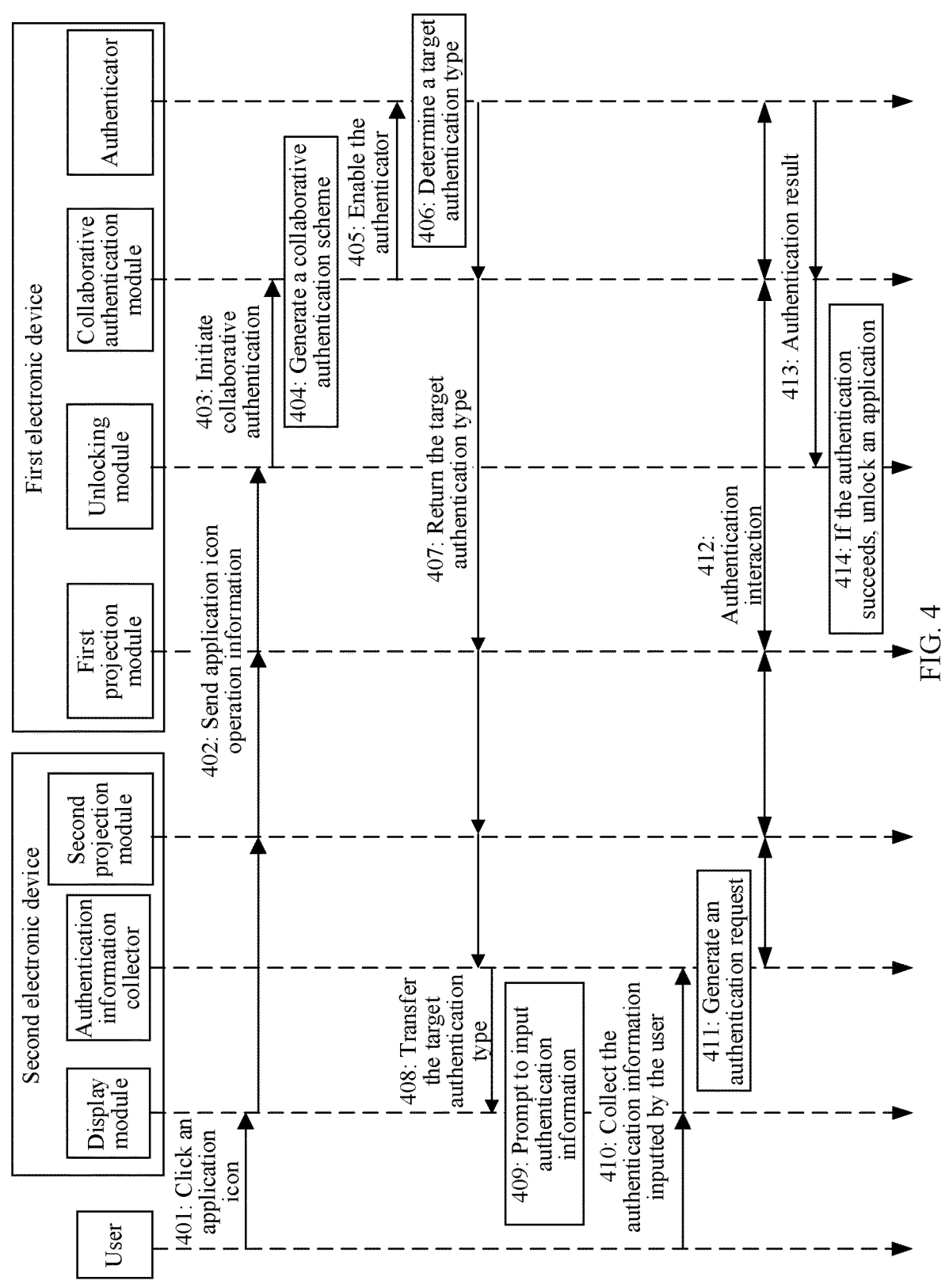
FIG. 4 is a flowchart of an electronic device unlocking method according to another embodiment of this application.

FIG. 4 is a flowchart of an electronic device unlocking method according to another embodiment of this application.

In FIG. 4, an example in which an application of a first electronic device (for example, a mobile phone) is unlocked on a second electronic device (for example, a computer) is used for description.

401: A user clicks an application icon in a collaboration window of the first electronic device displayed on the second electronic device, to open the application of the first electronic device.

402: The display module sends application icon operation information to an unlocking module through a second projection module and a first projection module, where the application icon operation information includes coordinates of a clicked position and a device identifier of the second electronic device.

The application icon operation information indicates to open a target application.

The first electronic device interacts with the second electronic device through the first projection module and the second projection module. The second projection module first sends the application icon operation information to the first projection module, and the first projection module then transfers the application icon operation information to the unlocking module.

403: The unlocking module determines, based on the coordinates of the clicked position, whether the application opened by the user is an application padlocked in the first electronic device, initiates collaborative authentication to a collaborative authentication module if the application opened by the user is the application padlocked in the first electronic device, and sends the device identifier of the second electronic device and unlocked target information to the collaborative authentication module.

In an embodiment of this application, if the application opened by the user is the application padlocked in the first electronic device, the unlocking module may further send an identifier (such as a package name) of an application lock to the collaborative authentication module. The application lock is a system-level application in the first electronic device, and protection (locking and unlocking) of the other applications is implemented using the application lock.

404: The collaborative authentication module generates a collaborative authentication scheme based on the device identifier of the second electronic device.

405: The collaborative authentication module enables an authenticator corresponding to the collaborative authentication scheme, and sends the collaborative authentication scheme to the authenticator corresponding to the collaborative authentication scheme.

The authenticator may return an enabling result to the collaborative authentication module. For example, if the authenticator is enabled successfully, the authenticator returns a message indicating successful enabling to the collaborative authentication module.

406: The authenticator determines a target authentication type corresponding to the collaborative authentication scheme.

407: The authenticator sends the target authentication type to the collaborative authentication module, and the collaborative authentication module sends the target authentication type and the unlocked target information to an authentication information collector corresponding to the collaborative authentication scheme through the first projection module and the second projection module, to enable the authentication information collector.

The authentication information collector may return an enabling result to the collaborative authentication module. For example, if the authentication information collector is enabled successfully, the authentication information collector returns a message indicating successful enabling to the collaborative authentication module.

408: The authentication information collector transfers the target authentication type to the display module.

409: The display module prompts, based on the target authentication type, the user to input authentication information.

410: The authentication information collector collects, based on the target authentication type, the authentication information inputted by the user.

411: The authentication information collector generates an authentication request, where the authentication request includes the authentication information inputted by the user and the unlocked target information.

412: The authentication information collector and the authenticator perform an authentication interaction through the second projection module, the first projection module, and the collaborative authentication module, and the authenticator performs authentication of the user based on the authentication information inputted by the user and the unlocked target information, to obtain an authentication result.

Figure 5:
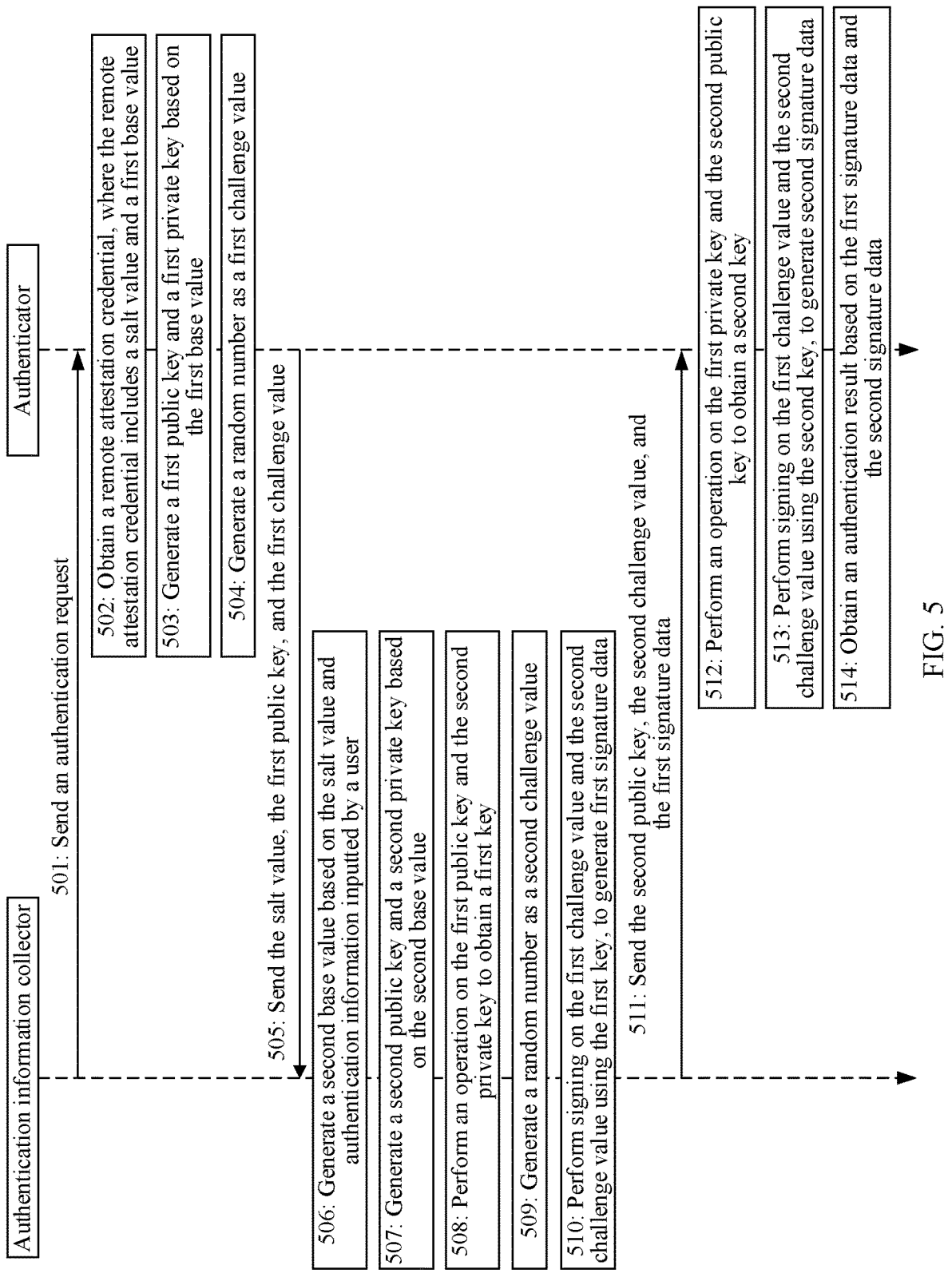
FIG. 5 is a detailed flowchart of authentication of a user in an electronic device unlocking method according to an embodiment of this application.

For a specific process in which the authentication information collector and the authenticator perform an authentication interaction, refer to FIG. 5.

413: The authenticator returns the authentication result to the unlocking module through the collaborative authentication module.

414: The unlocking module unlocks the application of the first electronic device based on the authentication result.

If the authentication of the user succeeds, the unlocking module unlocks the application of the first electronic device, and opens the application. If the authentication of the user fails, the unlocking module maintains the application of the first electronic device in a lock status, and does not open the application.

In an embodiment of this application, the unlocking module may unlock the application using the application lock in the first electronic device.

The first electronic device may obtain the authentication information from the second electronic device based on a password authentication protocol to perform authentication of the user.

FIG. 5 is a detailed flowchart of the authentication interaction (that is, step 313 and step 412) between the authentication information collector and the authenticator in the electronic device unlocking method disclosed in this embodiment of this application.

501: The authentication information collector sends the authentication request to the authenticator, where the authentication request includes the unlocked target information.

When initiating the collaborative authentication to the collaborative authentication module, the unlocking module sends the unlocked target information to the collaborative authentication module (referring to 304). When enabling the authentication information collector, the collaborative authentication module sends the unlocked target information to the authentication information collector.

In another embodiment of this application, the authentication request sent by the authentication information collector to the authenticator may not include the unlocked target information.

502: The authenticator obtains a remote attestation credential of the user based on the unlocked target information, where the remote attestation credential includes a salt value auth_salt and a first base value base1.

In another embodiment of this application, the authenticator may obtain the unlocked target information from the unlocking module.

When the user sets the authentication information (for example, a six-digit numerical password) on the first electronic device (for example, a mobile phone), the authenticator generates the remote attestation credential of the user, and stores the unlocked target information and the corresponding remote attestation credential in the authenticator.

When the user sets the authentication information (for example, a six-digit numerical password) on the first electronic device (for example, a mobile phone), the authenticator generates a random number as the salt value auth_salt, and performs a password-based key derivation function (Password-Based Key Derivation Function, PBKDF) iterative operation on the authentication information set by the user and the salt value auth_salt, to generate a first ciphertext secretData1. A biginteger modular exponentiation operation is performed on a square of the first ciphertext secretData1, to obtain the first base value base1.

503: The authenticator generates a first public key and a first private key (that is, a first public-private key pair is generated) based on the first base value base1.

The authenticator may generate a random number as the first private key sk1, and perform a biginteger modular exponentiation operation on the first base value base1 and the private key sk1, to obtain the first public key pk1.

504: The authenticator generates a random number as a first challenge value challenge1.

The authenticator can generate the random number by invoking a random number generator.

505: The authenticator sends the salt value auth_salt, the first public key, and the first challenge value challenge1 to the authentication information collector.

506: The authentication information collector generates a second base value base2 based on the salt value auth_salt and the authentication information inputted by the user.

The authentication information collector may perform a PBKDF iterative operation on the authentication information inputted by the user and the salt value auth_salt, to generate a second ciphertext secretData2, and perform a biginteger modular exponentiation operation on a square of the second ciphertext secretData2, to obtain the second base value base2.

507: The authentication information collector generates a second public key and a second private key (that is, a second public-private key pair is generated) based on the second base value base2.

The authentication information collector may generate a random number as the second private key sk2, and perform a biginteger modular exponentiation operation on the second base value base2 and the private key sk2, to obtain the second public key pk2.

508: The authentication information collector performs an operation on the second private key and the first public key, to obtain a first key sessionKey1.

The authentication information collector may perform a biginteger modular exponentiation operation on the second private key and the first public key, to obtain the first key sessionKey1.

509: The authentication information collector generates a random number as a second challenge value challenge2.

510: The authentication information collector performs signing on the first challenge value challenge1 and the second challenge value challenge2 using the first key sessionKey1, to generate first signature data kcfDataC1.

The authentication information collector may use the first challenge value challenge1 and the second challenge value challenge2 as a plaintext, and use the first key sessionKey1 as a key, to generate the first signature data kcfDataC1 according to a hash-based message authentication code (Hash-based Message Authentication Code, HMAC) algorithm.

511: The authentication information collector sends the second public key, the second challenge value challenge2, and the first signature data kcfDataC1 to the authenticator.

512: The authenticator performs an operation on the first private key and the second public key to obtain a second key sessionKey2.

The authenticator may perform a biginteger modular exponentiation operation on the first private key and the second public key, to obtain the second key sessionKey2.

513: The authenticator performs signing on the first challenge value challenge1 and the second challenge value challenge2 using the second key sessionKey2, to generate second signature data kcfDataC2.

The authenticator may use the first challenge value challenge1 and the second challenge value challenge2 as a plaintext, and use the second key sessionKey2 as a key, to generate the second signature data kcfDataC2 according to the HMAC algorithm.

514: The authenticator determines the authentication result based on the first signature data and the second signature data.

The authenticator determines whether the second signature data kcfDataC2 is consistent with the first signature data kcfDataC1 sent by the authentication information collector. If the second signature data kcfDataC2 is consistent with the first signature data kcfDataC1 sent by the authentication information collector, the authentication of the user succeeds. If the second signature data kcfDataC2 is inconsistent with the first signature data kcfDataC1 sent by the authentication information collector, the authentication of the user fails.

In the embodiment shown in FIG. 5, the authenticator and the authentication information collector perform the authentication interaction with each other according to a password-based authentication key exchange protocol, and the authentication information is transmitted between the first electronic device and the second electronic device in an encrypted form, thereby further improving security of cross-device unlocking.

In the foregoing embodiment, the electronic device unlocking method provided in this application is applied to a scenario in which the first electronic device performs projection on the second electronic device, and the second electronic device sends operation information (such as the unlocking operation information in FIG. 3A or the application icon operation information in FIG. 4) to the first electronic device based on a user operation of the first electronic device that performs projection on an interface of the second electronic device.

In another embodiment of this application, the electronic device unlocking method provided in this application may be applied to a non-projection scenario (the first electronic device does not perform projection on the second electronic device). In the non-projection scenario, the second electronic device may generate a control interface (which is not a projection interface) of the first electronic device, the user may perform an operation on the control interface, and the second electronic device may send operation information to the first electronic device based on the user operation on the control interface.

In the foregoing embodiment, the first electronic device includes the first projection module, the unlocking module, the collaborative authentication module, and the authenticator. The second electronic device includes the second projection module, the authentication information collector, and the display module. In another embodiment of this application, the first electronic device and the second electronic device may be divided into other function modules.

Figure 6:
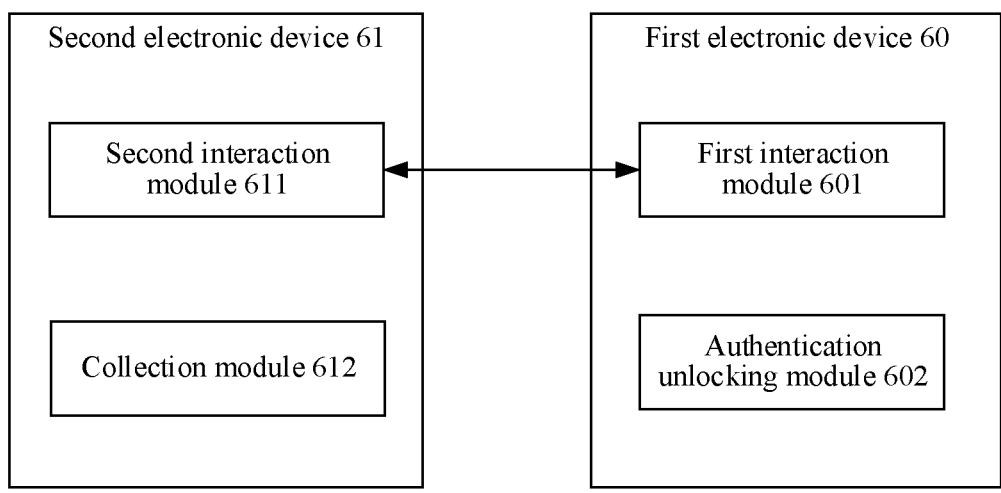
FIG. 6 is another function architectural diagram of a first electronic device and a second electronic device to which an electronic device unlocking method according to an embodiment of this application is applied.

FIG. 6 is another function architectural diagram of a first electronic device and a second electronic device to which an electronic device unlocking method according to an embodiment of this application is applied. Refer to FIG. 6, a first electronic device 60 may include a first projection module 601 and an authentication unlocking module 602, and a second electronic device 61 may include a second projection module 611 and a collection module 612.

The first projection module 601 is configured to receive operation information sent by the second electronic device 61. The first projection module 601 is further configured to send first information to the second electronic device when determining, based on the operation information, to unlock a to-be-unlocked object of the first electronic device. The first information is used by the second electronic device to collect authentication information required for unlocking the to-be-unlocked object.

The authentication unlocking module 602 is configured to obtain the authentication information from the second electronic device to perform authentication of a user, and unlock the to-be-unlocked object of the first electronic device when the authentication of the user succeeds.

The second projection module 611 is configured to send operation information of a user operation performed by using the second electronic device to the first electronic device. The user operation triggers unlocking of the to-be-unlocked object of the first electronic device.

The second projection module 611 is further configured to receive the first information from the first electronic device. The first information is sent when the first electronic device determines, based on the operation information, to unlock the to-be-unlocked object of the first electronic device, and is used by the second electronic device to collect the authentication information required for the to-be-unlocked object.

The collection module 612 is configured to collect, based on the first information, the authentication information required for unlocking the to-be-unlocked object, and provide the authentication information to the first electronic device to perform authentication of the user, and a result of the authentication of the user is used to determine whether to unlock the to-be-unlocked object.

Figure 7:
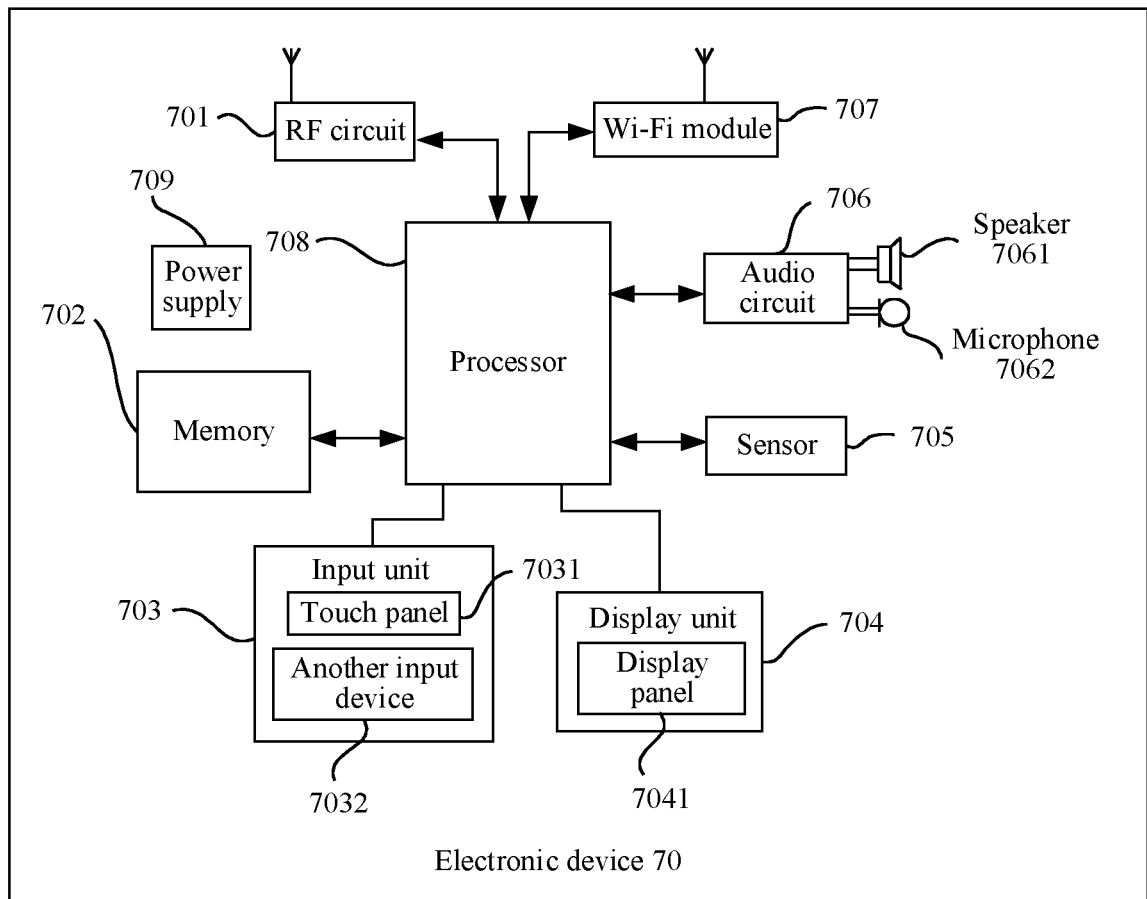
FIG. 7 is a schematic diagram of a structure of an electronic device according to an embodiment of this application.

FIG. 7 is a schematic diagram of a structure of an electronic device (a first electronic device or a second electronic device) according to an embodiment of this application. As shown in FIG. 6, the electronic device 70 may include: a radio frequency (Radio Frequency, RF) circuit 701, a memory 702, an input unit 703, a display unit 704, a sensor 705, an audio circuit 706, a Wi-Fi module 707, a processor 708, a power supply 709, and other components. A person skilled in the art may understand that the structure shown in FIG. 7 does not constitute a limitation to a service flow aggregation and forwarding node, and the node may include more components or fewer components than those shown in the figure, or some components may be combined, or a different component deployment may be used.

The RF circuit 701 may be configured to receive and transmit a signal in an information receiving and transmission process or a call process, and in particular, after receiving downlink information of a base station, transmit the downlink information to the processor 708 for processing. In addition, the RF circuit 701 sends uplink data to the base station. Usually, the RF circuit 701 includes but is not limited to: an antenna, at least one amplifier, a transceiver, a coupler, a low noise amplifier (Low Noise Amplifier, LNA), a duplexer, and the like.

A memory 702 may be configured to store a software program and a module. The processor 708 runs the software program and the module stored in the memory 702, to execute various functional applications of the electronic device and perform data processing. The memory 702 may mainly include a program storage area and a data storage area. The program storage area may store an operating system, an application program required by at least one function (for example, a sound playing function and an image playing function), and the like. The data storage area may store data (for example, audio data and a telephone book) and the like created according to use of the electronic device. In addition, the memory 702 may include a high speed random access memory, and may further include a non-volatile memory, such as at least one magnetic disk storage device, a flash memory, or another volatile solid-state storage device.

The input unit 703 may be configured to receive input numeral or character information, and generate a key signal input related to a user setting and function control of the electronic device. Specifically, the input unit 703 may include a touch panel 7031 and another input device 7032. The touch panel 7031, also referred to as a touchscreen, may collect a touch operation of a user on or near the touch panel 7031 (such as an operation of the user on the touch panel 7031 or near the touch panel 7031 using any suitable object or accessory such as a finger or a stylus), and drive a corresponding connection apparatus based on a preset program. Optionally, the touch panel 7031 may include two parts: a touch detection apparatus and a touch controller. The touch detection apparatus detects a touch orientation of the user, detects a signal brought by the touch operation, and transmits the signal to the touch controller. The touch controller receives touch information from the touch detection apparatus, converts the touch information into contact coordinates, then transmits the contact coordinates to the processor 708, receives and executes a command transmitted by the processor 708. In addition, the touch panel 7031 may be implemented by a resistive type, a capacitive type, an infrared type, and a surface acoustic wave type, and the like. In addition to the touch panel 7031, the input unit 703 may further include the another input device 7032. Specifically, the another input device 7032 may include but is not limited to one or more of a physical keyboard, a functional key (such as a volume control key or a switch key), a track ball, a mouse, a joystick, and the like.

The display unit 704 may be configured to display information inputted by the user or information provided for the user, and various menus of the electronic device. The display unit 704 may include a display panel 7041. Optionally, the display panel 7041 may be configured in a form of a liquid crystal display (Liquid Crystal Display, LCD), an organic light-emitting diode (Organic Light-Emitting Diode, OLED), or the like. Further, the touch panel 7031 may cover the display panel 7041. After detecting a touch operation on or near the touch panel, the touch panel 7031 transfers the touch operation to the processor 708, to determine a type of a touch event. Then, the processor 708 provides a corresponding visual output on the display panel 7041 based on the type of the touch event. In FIG. 6, the touch panel 7031 and the display panel 7041 implement, as two independent parts, input and output functions of the electronic device. However, in some embodiments, the touch panel 7031 and the display panel 7041 may be integrated to implement the input and output functions of the electronic device.

The electronic device may further include at least one sensor 705, such as an optical sensor, a motion sensor, and other sensors. Specifically, the optical sensor may include an ambient light sensor and a proximity sensor. The ambient light sensor may adjust luminance of the display panel 7041 based on brightness of the ambient light. The proximity sensor may switch off the display panel 7041 and/or backlight when the electronic device is moved to an ear. As a type of the motion sensor, an accelerometer sensor may detect magnitudes of accelerations in various directions (which are generally three axes), and may detect a magnitude and a direction of gravity when static, which may be configured for an application of recognizing gestures of the electronic device (such as horizontal and vertical screen switching, related games, and magnetometer posture calibration), a vibration recognition related function (such as a pedometer and a tap), and the like. In addition, the electronic device may be further configured with another sensor such as a gyroscope, a barometer, a hygrometer, a thermometer, and an infrared sensor. Details are not described herein again.

The audio circuit 706, a speaker 7061 and a microphone 7062 may provide an audio interface between the user and the electronic device. The audio circuit 706 may transmit, to the speaker 7061, an electrical signal obtained by converting received audio data, and the speaker 7061 converts the electrical signal into a voice signal for outputting. According to another aspect, the microphone 7062 converts the collected sound signal into an electrical signal. After receiving the electrical signal, the audio circuit 706 converts the electrical signal into audio data, and then outputs the audio data. After being processed by the processor 708, the audio data is transmitted through the RF circuit 701 to another electronic device or the audio data is outputted to the memory 702 for further processing.

Wi-Fi is a short distance wireless transmission technology. The electronic device may help, using the Wi-Fi module 707, the user to receive and transmit an email, browse a web page, and access streaming media, and the like, which provides wireless broadband Internet access for the user. Although FIG. 6 shows the Wi-Fi module 707, it may be understood that, the Wi-Fi module 707 is not a necessary component of the electronic device, and when required, the Wi-Fi module 707 may be omitted as long as the scope of the essence of the present invention is not changed.

The processor 708 is a control center of the electronic device, and connects various parts of the entire electronic device through various interfaces and lines. By running or executing the software program and/or the module stored in the memory 702, and invoking data stored in the memory 702, the processor 708 performs various functions of the electronic device and processes data, thereby performing overall monitoring on the electronic device. Optionally, the processor 708 may include one or more processing units. Preferably, the processor 708 may integrate an application processor and a modem. The application processor mainly processes an operating system, a user interface, an application, and the like. The modem mainly processes wireless communication. It may be understood that, the modem processor may alternatively not be integrated into the processor 708.

The electronic device further includes a power supply 709 (such as a battery) supplying power to the component. Optionally, the power supply may be logically connected to the processor 708 through a power management system, to implement functions such as charging, discharging, and power consumption management through the power management system.

Although not shown in the figure, the electronic device may further include a camera, a Bluetooth module, and the like. Details are not described herein again.

The electronic device shown in FIG. 7 may be configured to implement some or all procedures in the method embodiments described in FIG. 3A to FIG. 5 of this application. For details, refer to related descriptions in the embodiments described in FIG. 3A to FIG. 5. Details are not described herein again.

This embodiment further provides a computer storage medium. The computer storage medium stores computer instructions. When the computer instructions are run on an electronic device, the electronic device is enabled to perform the foregoing related method steps, to implement the blockchain signature verification method in the foregoing embodiments.

This embodiment further provides a computer program product. When the computer program product is run on an electronic device, the electronic device is enabled to perform the foregoing related steps, to implement the blockchain signature verification method in the foregoing embodiments.

In addition, an embodiment of this application further provides an apparatus. The apparatus may be specifically a chip, a component, or a module. The apparatus may include a processor and a memory that are connected. The memory is configured to store computer-executable instructions. When the apparatus runs, the processor may execute the computer-executable instructions stored in the memory, to enable the chip to perform the blockchain signature verification method in the foregoing method embodiments.

The electronic device, the computer storage medium, the computer program product, or the chip provided in the embodiments may be configured to perform the corresponding method provided above. Therefore, for beneficial effects that can be achieved, refer to the beneficial effects of the corresponding method provided above. Details are not described herein again.

Through the descriptions of the foregoing implementations, a person skilled in the art may clearly understand that, for the purpose of convenient and brief description, division of the foregoing functional modules is merely used as an example for description. In actual application, the foregoing functions may be allocated to and completed by different functional modules as required. That is, an inner structure of an apparatus is divided into different functional modules to complete all or some of the functions described above.

In the several embodiments provided in this application, it should be understood that the disclosed apparatus and method may be implemented in other manners. For example, the described apparatus embodiment is merely an example. For example, division of the modules or units is merely logical function division and may be other division in actual implementation. For example, a plurality of units or components may be combined or integrated into another apparatus, or some features may be ignored or not performed. In addition, the displayed or discussed mutual couplings, direct couplings, or communication connections may be implemented through some interfaces. The indirect couplings or communication connections between the apparatuses or units may be implemented in an electrical, mechanical, or another form.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in embodiments of this application may be integrated into one processing unit, each unit may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An electronic device unlocking method implemented by a first electronic device, wherein the electronic device unlocking method comprises:

receiving operation information from a second electronic device, wherein the operation information indicates to open a to-be-unlocked object;

determining, based on a first authentication manner used by the first electronic device and a second authentication manner supported by the second electronic device, a third authentication manner that is both used by the first electronic device and supported by the second electronic device as an authentication manner for unlocking the to-be-unlocked object;

sending first information to the second electronic device when determining, based on the operation information, to unlock the to-be-unlocked object of the first electronic device, wherein the to-be-unlocked object is a target application comprising a padlocked application, wherein the first information instructs a target authentication information collector of the second electronic device to obtain authentication information for unlocking the to-be-unlocked object, wherein the first information comprises a target authentication type corresponding to the authentication manner, and wherein the target authentication type indicates the target authentication information collector;

obtaining the authentication information from the second electronic device;

performing authentication of a user based on the authentication information; and unlocking the to-be-unlocked object of the first electronic device when the authentication of the user succeeds.

2. The electronic device unlocking method according to claim 1, further comprising performing projection on the second electronic device.

3. The electronic device unlocking method according to claim 1, further comprising further obtaining the authentication information based on a password authentication protocol for performing the authentication of the user.

4. The electronic device unlocking method according to claim 3, wherein obtaining the authentication information based on the password authentication protocol comprises:

receiving a remote attestation credential of the user from the second electronic device, wherein the remote attestation credential comprises a salt value and a first base value;

generating a first public key and a first private key based on the first base value;

generating a first random number as a first challenge value;

sending the salt value, the first public key, and the first challenge value to the second electronic device;

receiving a second public key, a second challenge value, and first signature data from the second electronic device, wherein the second public key is based on a second base value, wherein the second base value is based on the salt value and the authentication information, wherein the second challenge value is a second random number, wherein the first signature data is based on the first challenge value, the second challenge value, and a first key, wherein the first key is based on a second private key and the first public key, and wherein the second private key is based on the second base value;

performing an operation on the first private key and the second public key to obtain a second key;

performing signing on the first challenge value and the second challenge value using the second key to generate second signature data; and determining an authentication result based on the first signature data and the second signature data.

5. The electronic device unlocking method according to claim 1, wherein before obtaining the authentication information, the electronic device unlocking method further comprises receiving an authentication request from the second electronic device.

6. The electronic device unlocking method according to claim 1, wherein the operation information comprises a device identifier of the second electronic device, and wherein determining the third authentication manner as the authentication manner comprises determining, based on the device identifier, the second authentication manner.

7. The electronic device unlocking method according to claim 6, wherein determining, based on the device identifier, the second authentication manner comprises:

obtaining collector information of the second electronic device based on the device identifier, wherein the collector information indicates an authentication information collector comprised in the second electronic device; and determining, based on the collector information, the second authentication manner.

8. The electronic device unlocking method according to claim 7, wherein determining, based on the collector information of the second authentication manner comprises when determining, based on the collector information, that the second electronic device comprises a face image collector, a fingerprint collector, or a password collector, determining that the second authentication manner comprises password authentication, fingerprint authentication, or face authentication.

9. The electronic device unlocking method according to claim 1, wherein when a plurality of authentication manners are used by the first electronic device and supported by the second electronic device, the third authentication manner has a highest priority in the plurality of authentication manners.

10. The electronic device unlocking method according to claim 1, wherein the authentication manner is password authentication and the target authentication type is a four-digit numerical password, a six-digit numerical password, a user-defined numerical password, a pattern lock, or a hybrid password, wherein the authentication manner is face authentication and the target authentication type is two-dimensional (2D) face authentication or three-dimensional (3D) face authentication, or wherein the authentication manner is fingerprint authentication and the target authentication type is an in-screen fingerprint, a side fingerprint, or an under-screen fingerprint.

11. An electronic device unlocking method implemented by a second electronic device, wherein the electronic device unlocking method comprises:

sending operation information of a user operation on the second electronic device to a first electronic device, wherein the user operation instructs unlocking of a to-be-unlocked object that is of the first electronic device and that is a target application comprising a padlocked application;

receiving, in response to sending the operation information, first information from the first electronic device;

collecting, based on the first information, authentication information for unlocking the to-be-unlocked object, wherein the authentication information is based on an authentication manner, wherein the authentication manner is based on a third authentication manner that is both used by the first electronic device and supported by the second electronic device, and wherein the third authentication manner is based on a first authentication manner used by the first electronic device and a second authentication manner supported by the second electronic device; and providing the authentication information to the first electronic device for authentication of a user and unlocking the to-be-unlocked object.

12. An electronic device comprising:

at least one processor; and memory coupled to the at least one processor and configured to store programming instructions that, when executed by the at least one processor, cause the electronic device to:

receive operation information from a second electronic device, wherein the operation information indicates to open a to-be-unlocked object;

send first information to the second electronic device when determining, based on the operation information, to unlock the to-be-unlocked object of the electronic device, wherein the to-be-unlocked object is a target application comprising a padlocked application, and wherein the first information requests authentication information for unlocking the to-be-unlocked object;

obtain the authentication information from the second electronic device;

receive a remote attestation credential of a user from the second electronic device, wherein the remote attestation credential comprises a salt value and a first base value;

generate a first public key and a first private key based on the first base value;

generate a first random number as a first challenge value;

send the salt value, the first public key, and the first challenge value to the second electronic device;

receive a second public key, a second challenge value, and first signature data from the second electronic device, wherein the second public key is based on a second base value, wherein the second base value is based on the salt value and the authentication information, wherein the second challenge value is a second random number, wherein the first signature data is based on the first challenge value, the second challenge value, and a first key, wherein the first key is based on a second private key and the first public key, and wherein the second private key is based on the second base value;

perform an operation on the first private key and the second public key to obtain a second key;

perform signing on the first challenge value and the second challenge value using the second key to generate second signature data;

determine an authentication result based on the first signature data and the second signature data;

perform authentication of the user based on the authentication information; and unlock the to-be-unlocked object of the electronic device when the authentication of the user succeeds.

13. The electronic device according to claim 12, wherein the first information instructs a target authentication information collector of the second electronic device to obtain the authentication information, and wherein the first information comprises a target authentication type corresponding to an authentication manner for unlocking the to-be-unlocked object and that indicates the target authentication information collector or comprises an identifier of the target authentication information collector.

14. The electronic device according to claim 13, wherein the programming instructions further cause the electronic device to:

determine a first authentication manner used by the electronic device;

determine a second authentication manner supported by the second electronic device; and determine, based on the first authentication manner and the second authentication manner, a third authentication manner that is both used by the electronic device and supported by the second electronic device as the authentication manner.

15. The electronic device according to claim 12, wherein the programming instructions further cause the electronic device to perform projection on the second electronic device.

16. The electronic device according to claim 12, wherein before obtaining the authentication information, the programming instructions further cause the electronic device to receive an authentication request from the second electronic device.

17. The electronic device according to claim 14, wherein the operation information comprises a device identifier of the second electronic device, and wherein the programming instructions further cause the electronic device to determine, based on the device identifier, the second authentication manner.

18. The electronic device according to claim 17, wherein the programming instructions further cause the electronic device to:

obtain collector information of the second electronic device based on the device identifier, wherein the collector information indicates an authentication information collector comprised in the second electronic device; and determine, based on the collector information, the second authentication manner.

19. The electronic device according to claim 14, wherein when a plurality of authentication manners are used by the electronic device and supported by the second electronic device, the third authentication manner has a highest priority in the plurality of authentication manners.

20. The electronic device according to claim 17, wherein the authentication manner is password authentication and the target authentication type is a four-digit numerical password, a six-digit numerical password, a user-defined numerical password, a pattern lock, or a hybrid password, wherein the authentication manner is face authentication and the target authentication type is two-dimensional (2D) face authentication or three-dimensional (3D) face authentication, or wherein the authentication manner is fingerprint authentication and the target authentication type is an in-screen fingerprint, a side fingerprint, or an under-screen fingerprint.

* * * * *